US011546777B2

(12) United States Patent
Yang et al.

(10) Patent No.: US 11,546,777 B2
(45) Date of Patent: Jan. 3, 2023

(54) METHOD AND SYSTEM FOR OBJECT DETECTION BASED ON NETWORK BEAMFORMING

(71) Applicant: Verizon Patent and Licensing Inc., Basking Ridge, NJ (US)

(72) Inventors: Jin Yang, Orinda, CA (US); Krishna K. Bellamkonda, Roanoke, TX (US); Greg Augustus Rusu, Somerset, NJ (US); Ahmed Moussa, Montclair, NJ (US); Vijayalakshmi Paduvalli, Livingston, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 113 days.

(21) Appl. No.: 16/992,502

(22) Filed: Aug. 13, 2020

(65) Prior Publication Data

US 2022/0053337 A1    Feb. 17, 2022

(51) Int. Cl.
| | | |
|---|---|---|
| *H04W 16/14* | (2009.01) | |
| *H04W 24/10* | (2009.01) | |
| *H04B 17/336* | (2015.01) | |
| *H04B 17/318* | (2015.01) | |
| *H04W 88/06* | (2009.01) | |
| *H04W 48/18* | (2009.01) | |

(52) U.S. Cl.
CPC ......... *H04W 16/14* (2013.01); *H04B 17/318* (2015.01); *H04B 17/336* (2015.01); *H04W 24/10* (2013.01); *H04W 48/18* (2013.01); *H04W 88/06* (2013.01)

(58) Field of Classification Search
CPC ....... A45C 11/00; A45C 13/00; A45C 13/005; A45C 2011/001; A45C 2011/002; A45C 2011/003; A45C 2200/15; A45C 13/001; A45C 13/002; H04M 1/02; H04M 1/0283; E05D 11/08; H04B 1/3888
See application file for complete search history.

(56) References Cited

U.S. PATENT DOCUMENTS

| | | | | |
|---|---|---|---|---|
| 2017/0171754 A1* | 6/2017 | South | ...................... | H04W 4/02 |
| 2018/0300977 A1* | 10/2018 | Kusens | ............... | G06F 16/9535 |
| 2019/0213860 A1* | 7/2019 | Shaprio | ............. | G08B 21/0288 |
| 2020/0092681 A1* | 3/2020 | Shapiro | ................. | G16H 50/30 |
| 2020/0166610 A1* | 5/2020 | Lin | .......... | G01S 13/10 |
| 2021/0366611 A1* | 11/2021 | Johnson | ................ | A61B 5/1113 |

* cited by examiner

*Primary Examiner* — Julio R Perez

(57) ABSTRACT

A method, a device, and a non-transitory storage medium are described in which a beamforming-based detection service is provided. A radio device of a radio access network may receive radio information relating to a location. A current radio contour of the location may be generated based on signal and noise data. The current radio contour may be compared to a default radio contour of the location. The current radio contour may be compared to an event-based radio contours that indicate various events. A determination may be made whether an event has occurred based on a result of the comparison. A response may be provided when the event is detected.

20 Claims, 7 Drawing Sheets

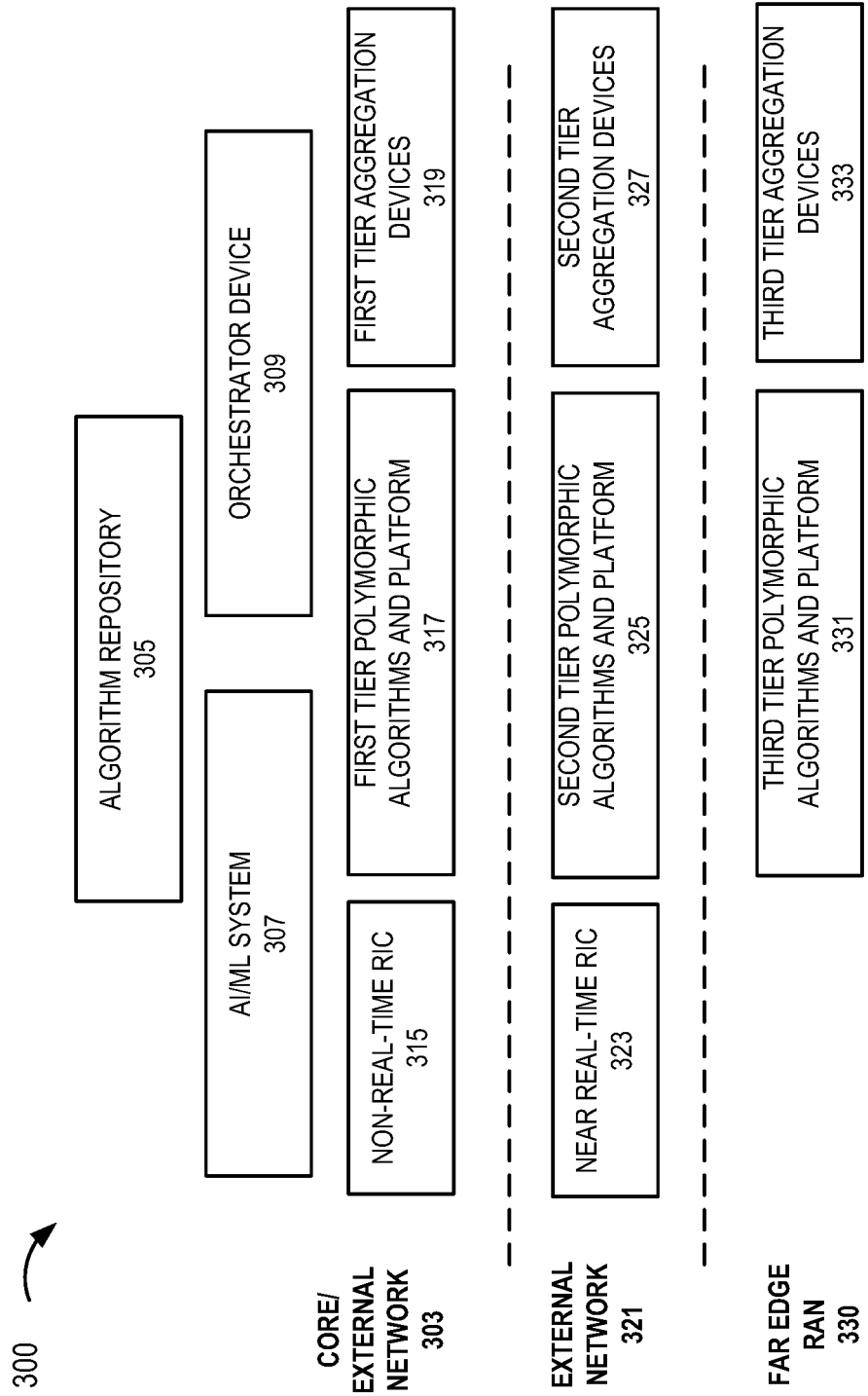

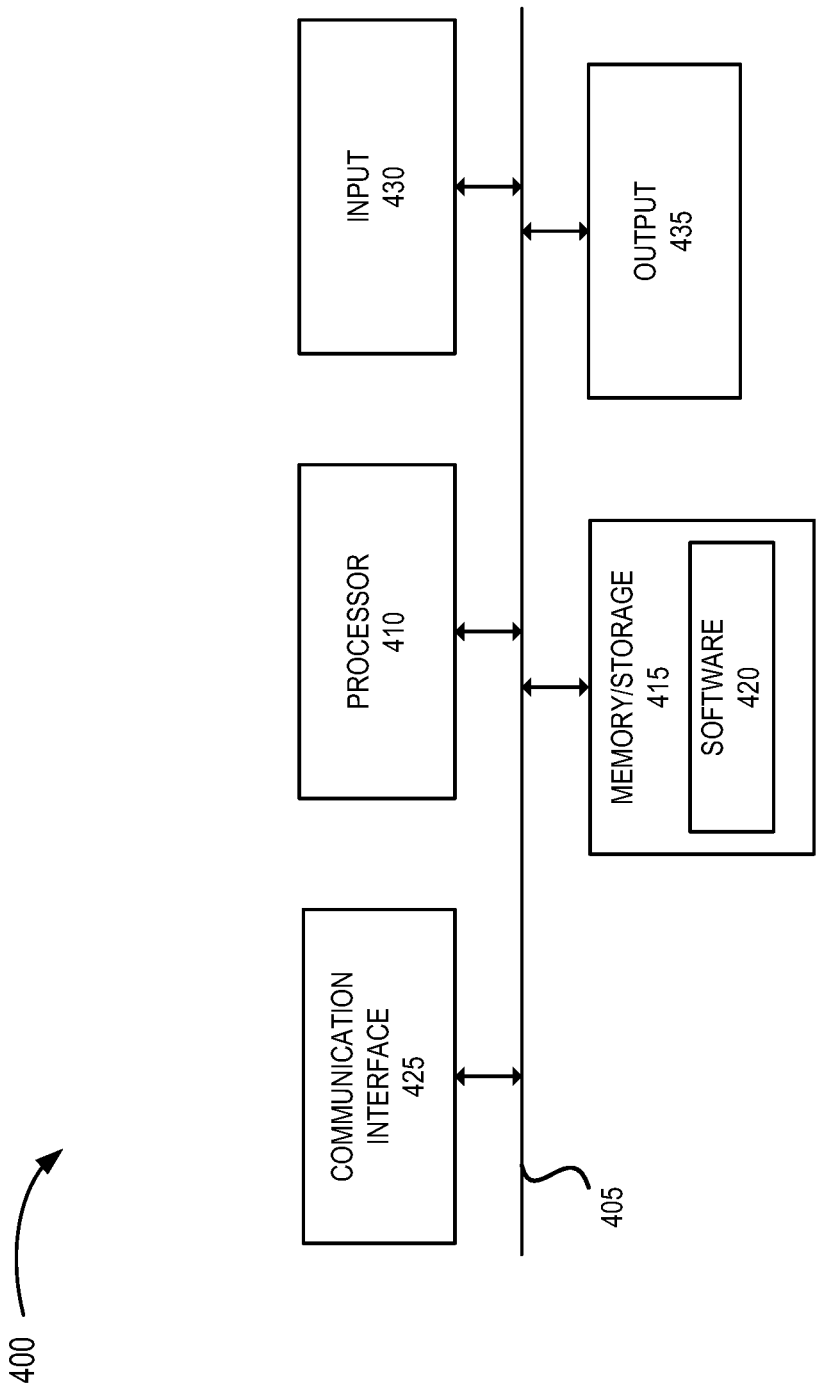

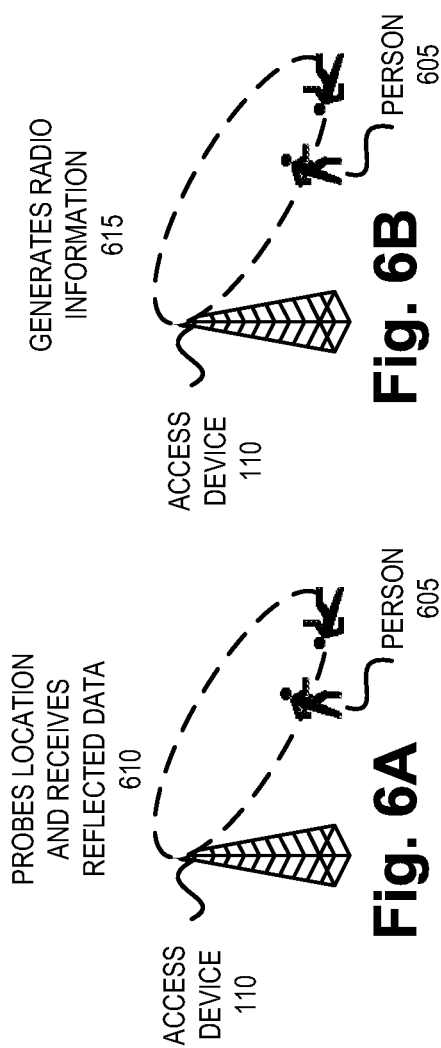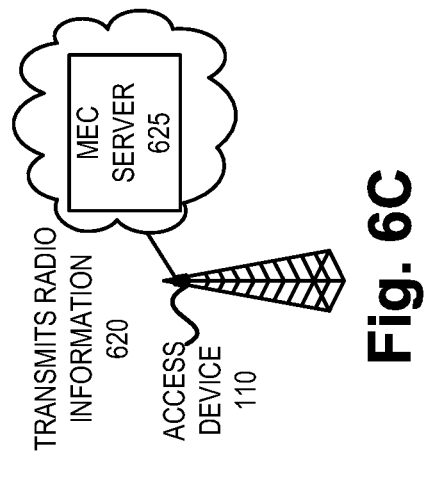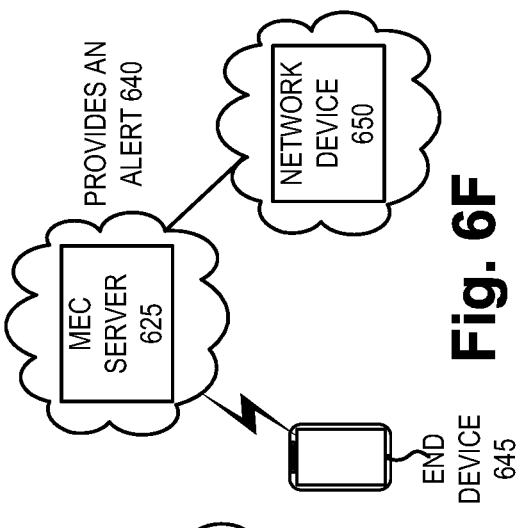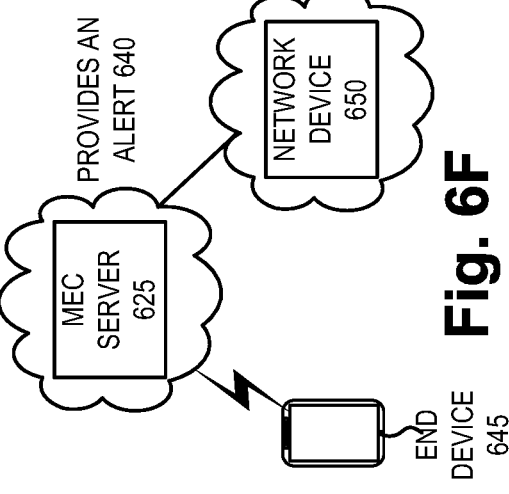

METHOD AND SYSTEM FOR OBJECT DETECTION BASED ON NETWORK BEAMFORMING

BACKGROUND

A wireless network may use directional radio signals, such as beamforming, to support wireless communications. Beamforming may also be applied to other applications, such as object detection.

BRIEF DESCRIPTION OF THE DRAWINGS

FIG. 3A is a diagram illustrating an exemplary system in which an exemplary embodiment of the beamforming-based detection service may be implemented;

FIG. 4 is a diagram illustrating exemplary components of a device that may correspond to one or more of the devices illustrated and described herein;

FIGS. 6A-6F are diagrams illustrating an exemplary embodiment of the beamforming-based detection service according to an exemplary scenario.

DETAILED DESCRIPTION OF PREFERRED EMBODIMENTS

Figure 1:
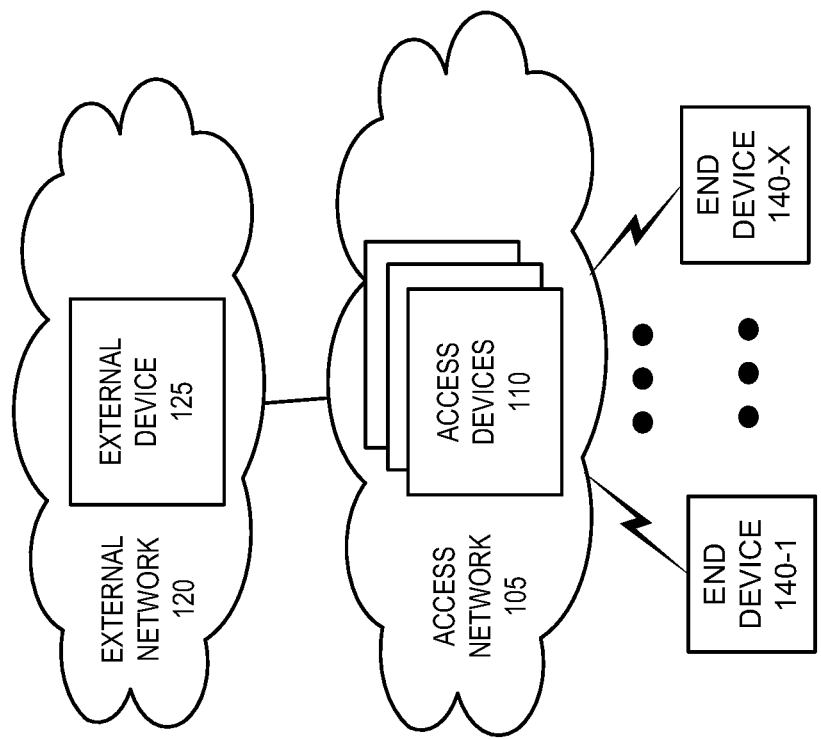
FIG. 1 is a diagram illustrating an exemplary environment in which an exemplary embodiment of a beamforming-based detection service may be implemented.

The following detailed description refers to the accompanying drawings. The same reference numbers in different drawings may identify the same or similar elements. Also, the following detailed description does not limit the invention.

Massive Multiple Input Multiple Output (MIMO) and other types of multi-antenna arrays or configurations may be used to improve various metrics of a wireless service, such as accessibility, capacity, latency, coverage, reliability, and other performance features. For example, a wireless station may use beamforming to control antenna signals (e.g., direction, magnitude, phase, etc.) for a given coverage area. There are different types of beamforming techniques, such as digital beamforming, analog beamforming, or hybrid beamforming that may accommodate Single User (SU)-MIMO or Multi-User (MU)-MIMO scenarios, for example.

In addition to wireless communication, beamforming may be used in a radar context. For example, millimeter (mm) wave or other radio frequency bands (e.g., non-mm wave, unlicensed band, C-Band, Citizens Broadband Radio Service (CBRS) band, Megahertz band, higher than mm wave, or other suitable radio spectrum) may be implemented for object and motion detection and other types of detection (e.g., materials, temperature, etc.).

According to exemplary embodiments, a beamforming-based detection service is provided. According to an exemplary embodiment, the beamforming-based detection service may use terrain and topology information and historic radio measurement and configuration information to create a radio contour of a location. For example, the radio contour may provide a baseline radio scatter image of the location. The radio contour may include the total radio signal received (e.g., signal and noise).

According to an exemplary embodiment, the beamforming-based detection service may detect a change in the baseline radio scatter image of the location, as described herein. According to an exemplary embodiment, the beamforming-based detection service may include artificial intelligence (AI) and/or machine learning that may detect a change in the radio scatter image, such as the detection of an object and its motion or other aspect of the location. According to an exemplary embodiment, the beamforming-based detection service may include an edge server or other type of real-time or near real-time processing server to detect a current radio contour of the location and a change in the radio contour. According to various exemplary embodiments, the beamforming-based detection service may provide an alert, object status, or other information of relevance depending on the radar-enabled application (e.g., health-monitoring, collision avoidance, weather avoidance for drones, smart manufacturing, military and public safety, etc.).

In view of the foregoing, wireless stations of a Fourth Generation (4G), Fifth Generation (5G), or other type of radio access network (RAN) (e.g., future generation RAN, Sixth Generation (6G) RAN, etc.) may provide a wireless communication service to users and may also support the beamforming-based detection service, as described herein.

FIG. 1 is a diagram illustrating an exemplary environment 100 in which an exemplary embodiment of the beamforming-based detection service may be implemented. As illustrated, environment 100 includes an access network 105 and an external network 120. Access network 105 includes access devices 110, and external network 120 includes an external device 125. Environment 100 may also include end devices 140-1 through 140-X (also referred to as end devices 140, or individually or generally as end device 140).

The number, type, and arrangement of networks illustrated in environment 100 are exemplary. Additionally, or alternatively, other networks not illustrated in FIG. 1 may be included in environment 100, such as a core network, a backhaul network, a fronthaul network, a mid-haul network, or another type of network, as described herein.

The number, the type, and the arrangement of network devices in access network 105 and external network 120, as illustrated and described, are exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

The number, the type, and the arrangement of end devices 140 are exemplary. End device 140 may include a device that has computational and/or wireless communicative capabilities. Depending on the implementation, end device 140 may be a mobile device, a portable device, a stationary device, a device operated by a user (e.g., UE, etc.), or a device not operated by a user (e.g., an Internet of Things (IoT) device, etc.). For example, end device 140 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device. End device 140 may be configured to execute various types of software (e.g., applications, programs, etc.). The number and the types of software may vary among end devices 140.

Environment 100 includes communication links between the networks and between network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary network device and/or an intermediary network. The number and the arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the beamforming-based detection service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), etc.) or a new interface of the network device may be provided in order to support the communication (e.g., transmission and reception of messages, information elements (IE), attribute value pairs (AVPs), etc.) between network devices and the beamforming-based detection service logic of the network device, as described herein. According to various exemplary implementations, the interface of the network device may be a service-based interface, a reference point-based interface, an Open Radio Access Network (O-RAN) interface, or some other type of interface.

Access network 105 may include one or multiple networks of one or multiple types and technologies. For example, access network 105 may be implemented to include a next generation RAN (e.g., a Fifth Generation (5G)-access network (5G-AN) or a 5G-RAN (referred to herein as simply a 5G-RAN)), a future generation RAN, a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), a RAN of an LTE-A Pro network, and/or another type of RAN (e.g., a legacy Third Generation (3G) RAN, etc.). Access network 105 may further include other types of wireless networks, such as a Wi-Fi network, a Worldwide Interoperability for Microwave Access (WiMAX) network, a local area network (LAN), a CBRS network, or another type of wireless network.

According to various exemplary embodiments, access network 105 may be implemented to include various architectures of wireless service, such as, for example, macrocell, microcell, femtocell, picocell, metrocell, new radio (NR) cell, LTE cell, non-cell, or another type of architecture. Additionally, according to various exemplary embodiments, access network 105 may be implemented according to various wireless technologies (e.g., RATs, etc.), wireless standards, wireless frequencies/bands/carriers (e.g., centimeter (cm) wave, mm wave, below 6 Gigahertz (GHz), above 6 GHz, higher than mm wave, licensed radio spectrum, unlicensed radio spectrum, etc.), and/or other types of attributes of radio communication.

Depending on the implementation, access network 105 may include one or multiple types of network devices, such as access devices 110. For example, access devices 110 may include a next generation Node B (gNB), an evolved Node B (eNB), an evolved Long Term Evolution (eLTE) eNB, a radio network controller (RNC), a remote radio head (RRH), a baseband unit (BBU), a centralized unit (CU), a distributed unit (DU), a radio unit (RU), a small cell node (e.g., a picocell device, a femtocell device, a microcell device, a home eNB, etc.), a future generation wireless access device (e.g., sixth generation (6G), etc.), or another type of wireless node (e.g., a WiMax device, a WiFi device, a repeater, etc.) that provides a wireless access service. According to some exemplary implementations, access device 110 may include a combined functionality of multiple RATs (e.g., 4G and 5G functionality).

Figure 2:
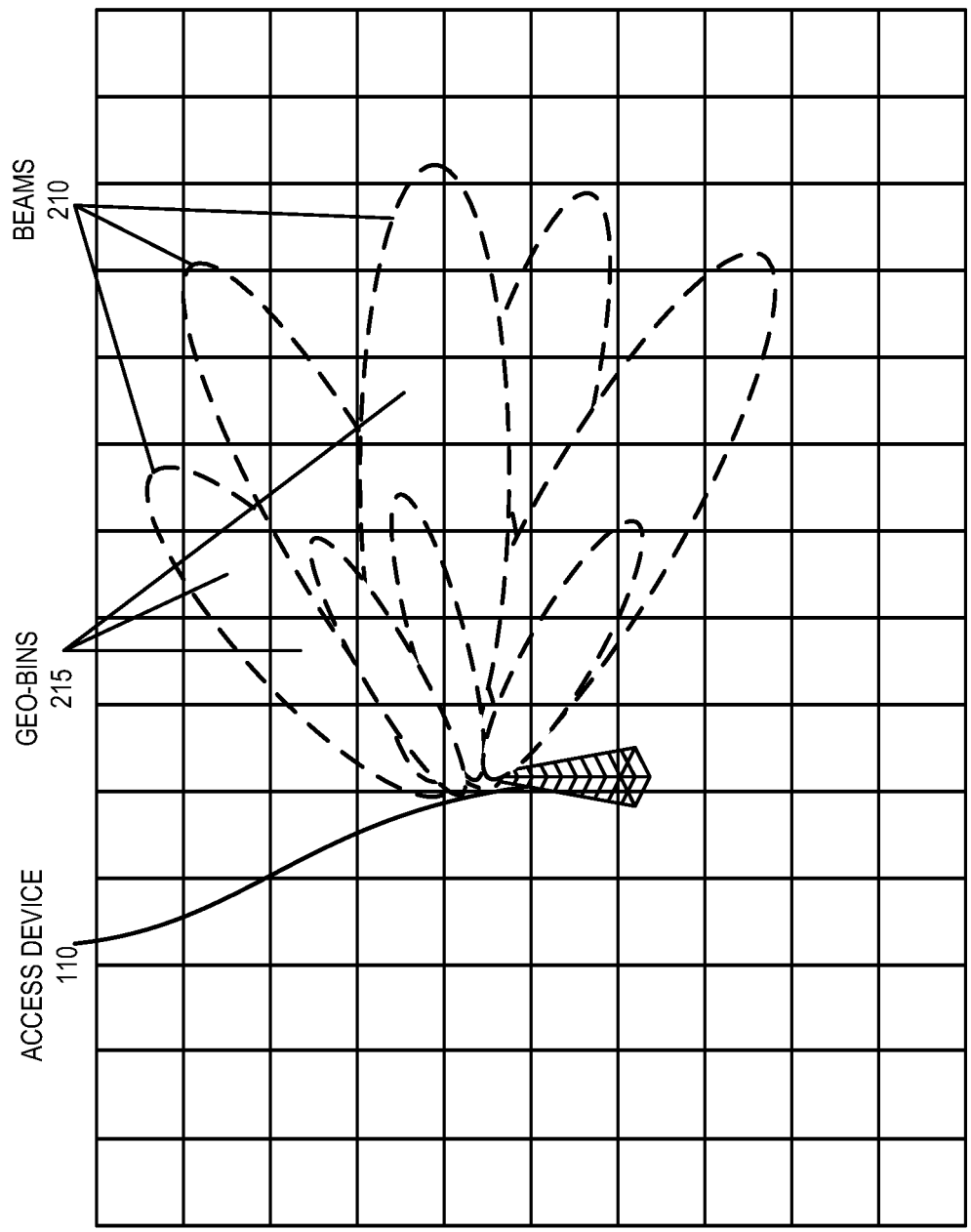
FIG. 2 is a diagram illustrating an exemplary configuration in which an exemplary embodiment of the beamforming-based detection service may be implemented.

According to an exemplary embodiment, access device 110 may provide the beamforming-based detection service. For example, the radio portion of access device 110 (e.g., antennas, radio versus baseband) may use beamforming to a location of relevance in support of the detection service, as described herein. For example, referring to FIG. 2, access device 110 may provide radio coverage of a location using (radio) beams 210. The coverage of the location may be segmented into smaller areas, which are depicted as geo-bins 215. For example, geo-bins 215 may be generated based on a Military Grid Reference System (MGRS) or other type of grid system. The size (e.g., area) and/or shape of each geo-bin 215 may be configurable. The size and/or the shape of geo-bin 215 may depend on the types of access device 110 (e.g., eNB versus gNB), attributes of access device 110 (e.g., antenna configuration, radio frequency band of beam, etc.), and/or other factors (e.g., characteristics of the location, field of use for the detection (e.g., health monitoring, manufacturing process, etc.) or other criteria of relevance). According to various exemplary embodiments, access device 110 may include one or multiple antennas. The antenna may be implemented according to various configurations, such as single input single output (SISO), single input multiple output (SIMO), multiple input single output (MISO), MIMO, massive MIMO, three dimensional (3D) beamforming (also known as full-dimensional MIMO), two dimensional (2D) beamforming, antenna spacing, tilt (relative to the ground), radiation pattern, directivity, elevation, and so forth.

According to various exemplary embodiments, access device 110 may receive radio information associated with geo-bin 215 via a radio receiver. The radio information may also be associated with a time. According to exemplary embodiments, the radio information may include a signal and noise. According to an exemplary embodiment, the signal and noise may relate to a mm wave of a radio spectrum. According to an exemplary embodiment, the beamforming-based detection service may extract, analyze, and profile the signal and/or the noise. The beamforming-based detection service may generate a radio contour of a location, as described herein. According to an exemplary embodiment, characteristics of the received signal component of the radio information may be known (e.g., characteristics of a reference signal, a pilot signal, or another type of radio signal). According to an exemplary embodiment, based on the profiling of the signal and/or noise, the beamforming-based detection service may detect an event. For example, as described herein, the event may relate to object detection and location, motion of the object, and/or other forms or use cases of detection.

According to an exemplary embodiment, access device 110 may transmit a radio signal using beamforming within the location. The radio signal may reflect off of one or multiple things and/or persons within geo-bin 215, and the reflected radio signal (e.g., radio information) may be received by access device 110, as described herein.

According to another exemplary embodiment, access device 110 may not transmit a radio signal, but receive radio information. For example, another access device 110 may transmit the radio signal, and access device 110 may receive the reflected radio signal or non-reflected radio signal. According to even other exemplary embodiments, access device 110 may receive radio information from end device 140. According to still other exemplary embodiments, access device 110 may receive radio information when no signal has been transmitted. For example, the radio information may pertain to an ambient signal and/or ambient noise. Access device 110 may include logic that determines when there are no active end users/devices 140, which may trigger a noise detection mode of operation. In the noise detection mode, access device 110 may lower the noise floor and receive via the radio receiver noise signals, which may be used for noise analysis and profiling, as described herein.

According to some exemplary embodiments, access device 110 may provide a RAN service and the beamforming-based detection service. According to other exemplary embodiments, access device 110 may provide the beamforming-based detection service but not the RAN service. As an example, access device 110 may be implemented as a beacon or other type of wireless station that probes the location with radio signals and receives reflected radio signals. According to various exemplary embodiments, the beacon may or may not transmit radio information associated with a reflected radio signal or non-reflected signal to another access device 110 that may provide the RAN service for wireless communications (e.g., access to a core network, external network, etc.) by end devices, users, and so forth. Access device 110 and the beamforming-based detection service is described further below.

Referring back to FIG. 1, external network 120 may include one or multiple networks of one or multiple types and technologies. For example, external network 120 may be implemented to include a service or an application-layer network, a cloud network, a private network, a multi-access edge computing (MEC) network (also known as a mobile edge computing), a fog network, or another type of network that may provide real-time or near-real time processing. According to an exemplary embodiment, external device 125 includes a network device that provides the beamforming-based detection service, as described herein. According to an exemplary embodiment, external device 125 includes AI-based analytics (e.g., ML learning, etc.), as described herein. The AI-based analytics may be trained to detect events, objects, motion of objects, and/or other features that may occur in the location subject to the beamforming-based detection service (referred to simply as "event") based on the radio information, as described herein. According to various exemplary embodiments, external device 125 may perform various types of actions (e.g., a response action) when an event or other criterion of relevance is detected, as described herein. External device 125 is described further below.

According to an exemplary embodiment, the beamforming-based detection service may be implemented in a hierarchical architecture. For example, an O-RAN Reference Architecture may include a non-real time RAN Intelligent Controller (RIC), a near-real-time RIC, various open interfaces (e.g., O1, A1, E2, open fronthaul interface, etc.), interoperability with standard interfaces (e.g., 3GPP interfaces, such as F1, W1, E1, X2, Xn, etc.), open network devices (e.g., O-RAN Centralized Unit (O-CU), O-RAN Distributed Unit (O-DU), O-RAN next generation Node B (O-gNB), O-RAN evolved Node B (O-eNB, etc.), white box hardware, and open source software. The hierarchical RICs may include ML models and/or AI components. The control functionality of the non-real-time RIC relates to a non-real-time timeframe and the control functionality of the near real-time RIC relates to a near real-time timeframe. Messages generated from AI-enabled policies and ML-based models of the non-real-time RIC may be communicated to the near-real-time RIC.

FIG. 3A is a diagram illustrating an exemplary system 300 in which an exemplary embodiment of the beamforming-based detection service may be implemented. As illustrated, system 300 may include a multi-tiered network. The multi-tiered network may include a core/external network 303, an external network 321, and a far edge RAN 330. According to other examples, the multi-tiered network may include a different number of tiers (e.g., two-tiered, four-tiered, etc.), different types of tiers, and/or a different type of network of a tier.

As illustrated, core/external network 303 may include an algorithm repository 305, an AI/ML system 307, a non-real-time RIC 315, a first tier polymorphic algorithms and platform 317, and first tier aggregation devices 319. According to various exemplary implementations, some or all of these components may be situated in a core network, an external network (e.g., external network 120), or a combination of both the core network and the external network.

Algorithm repository 305 may include a network device that stores polymorphic algorithms that relate to various optimization objectives and/or performance metrics pertaining to a network and the beamforming-based detection service. The polymorphic algorithms of an optimization objective and/or performance metric may share a normalized goal function across different time granularities and associated tiers of the network. Additionally, according to an exemplary embodiment, the polymorphic algorithms of an optimization objective and/or performance metric may apply the same logic and may use the same inputs, and outputs, albeit at different time granularities. In this way, the polymorphic algorithms may operate in different tiers of the network and provide a consistent goal function, such as the detection of an event (e.g., a presence of an object, motion of object, or other aspect of the location of relevance) based on known radio contours. Additionally, such a framework may ensure that the polymorphic algorithms may transition between tiers of a network, enable AWL system 307 to control sequencing of the polymorphic algorithms in terms of optimization objectives and/or performance metrics and transitioning between tiers, reduce the number of disparate algorithms (e.g., in terms of input/output, optimization logic, goal functions, etc.), and minimize the complexity for management and coordination.

To enforce algorithm singularity based on polymorphism, the polymorphic algorithms of an optimization objective and/or performance metric may include certain features pertaining to their input and their output. For example, the input of the polymorphic algorithms may include a time granularity profile that determines a tier of the network on which the polymorphic algorithm operates, a validity of profile (e.g., a duration for which the profile is valid), a goal function aggregation duration, exit criteria events, such as yield criterion (e.g., converge, diverge, a probability that a current radio contour matches a default or event-based radio contour), time-series criterion (e.g., transient threshold), error scenario handling, and fidelity and manifest to enable and disable. Additionally, for example, the output of the polymorphic algorithms may include a goal function scaling per network tier, a goal-to-yield realization, a self convergence check (e.g., using ML), a self assurance check (e.g., using ML), and an output profile format per time granularity profile.

According to an exemplary embodiment, the polymorphic algorithms may relate to the beamforming-based detection service. For example, the polymorphic algorithms may relate to the generation of a default or baseline radio contour of a location, the generation of an event-based radio contour, the generation of a current radio contour of the location, pattern matching between radio contours and identification of events (e.g., objects, motions of objects, and other aspects of the location) depending on the application (e.g., health monitoring, drone monitoring, etc.) of the detection service, as described herein.

AI/ML system 307 may include a network device that includes AI and/or ML logic. For example, AI/ML system 307 may include various learning-based and/or intelligence logic, such as reinforcement-based learning, unsupervised learning, semi-supervised learning, supervised learning, deep learning, artificial intelligence, and/or other types of device intelligence. AWL system 307 may analyze output data from first tier polymorphic algorithms and platform 317, second tier polymorphic algorithms and platform 325, and third tier polymorphic algorithms and platform 331 to determine whether a goal function is being met based on policies (e.g., related to thresholds, triggers, etc.) and various analytical assessments (e.g., detection of an event, cost function, time-series, telemetry, network location, uplink noise, beam identifiers, signal profile, noise profile, radio contour, etc.) to optimize and/or reach a performance target in relation to nodes of a tier of the network and the beamforming-based detection service.

AI/ML system 307 may include various models and radio contours directed to various applications or fields of use of the beamforming-based detection service. For example, AI/ML, system 307 may include models, radio contours (e.g., noise profiles, signal profiles) and parameter values (e.g., Reference Signal Power (RSP), Signal-to-Noise-Ratio (SINR), Received Signal Strength Indicator (RSSI), and/or other types of radio signal parameter values) that may be used to detect various events that may relate to health monitoring, drone monitoring, manufacturing, robotic equipment in manufacturing, public safety, military, and other fields where beamforming-based detection may be of use. AI/ML system 307 may also include logic that is adaptive such that when a current radio contour does not match learned radio contours, AI/ML system 307 may invoke learning procedures to improve a learned radio contour and/or generate a new radio contour that relates to an unknown event. In some cases, AI/ML system 307 may request training data for an unknown event.

Orchestrator device 309 may include a network device that orchestrates the polymorphic service provided by first tier polymorphic algorithms and platform 317, second tier polymorphic algorithms and platform 325, and third tier polymorphic algorithms and platform 331. Orchestrator device 309 may orchestrate virtual instances of the polymorphic algorithms at various tiers of the network, such as instantiation, deletion, suspension, transition to another tier, etc., based on feedback from AI/ML, system 307, policies, and goals/cost functions pertaining to the various types of polymorphic algorithms. The policies may include tier configuration policies, which may be driven by AI/ML system 307, for selecting the polymorphic algorithm type and access devices 110, cluster of access devices 110, cell, sector, and/or sub-sector (e.g., one or multiple geo-bins). Additionally, the policies may include tier exit criterion policies. For example, the tier exit policies may include static triggers and trigger thresholds for a radio access node, a cluster of radio access nodes, or some other grouping of nodes. In this way, a threshold or a rule involving the threshold within a policy may indicate how and when a polymorphic algorithm may automatically transition from one tier to another tier of the network, for example. Orchestrator device 309 may also orchestrate virtual instances of access devices 110, core devices of a core network (e.g., a packet gateway (PGW) device, a user plane function (UPF), or other type of data network aggregation point (DNAP)), and/or application layer devices at various tiers of the network, as described herein.

Orchestrator device 309 may monitor event or object detection performance (e.g., RAN and external network telemetry) at various time granularities, and may use predictive ML/AI models, polymorphic algorithms, and other information (e.g., context information, etc.), as described herein, for orchestration of network resources (e.g., cell, sector, clusters or groups of network devices, etc.) in support of the beamforming-based detection service.

Orchestrator device 309 may also use radio network and core/external network optimization routines to ensure that the beamforming-based detection service is satisfying performance constraints and demands. Orchestrator device 130 may orchestrate detection configurations across different tiers of the network based on learned AWL models, and orchestrate detection services using polymorphic algorithms across tiers in a mutually exclusive and contention-less manner. Orchestrator device 309 in combination with other network devices (e.g., AI/ML system 307, polymorphic platforms 317, 325, 331, etc.) may ensure a consistent level of service provided to a location based on yield and goal functions, convergence, and divergence factors, among other things, associated with context, time, and tier of network.

For any given device or group of devices of the network, a polymorphic algorithm of the beamforming-based detection service may be active in only a single tier of the network. In this regard, for example, in a three-tiered network, the polymorphic algorithm scope for a location or a cluster of locations of the network may be mutually exclusive such that (Scope(tier 1)) ∩ (Scope (tier 2)) ∩ (Scope (tier 3))==Null. So at a lowest denomination of the network (e.g., at an access device 110 level or one or multiple geo-bins), there may be only one polymorphic algorithm supervising the node from tier 1, tier 2, or tier 3 of the network. According to an exemplary embodiment, orchestrator device 309 may manage the transition of the polymorphic algorithms of the metric type to operate in another tier and associated time granularity.

Non-real-time RIC 315 may control and optimize various radio resources in support of the beamforming-based detection service associated with access network 105. First tier polymorphic algorithms and platform 317 includes network devices that host polymorphic algorithms. For example, first tier polymorphic algorithms and platform 317 may include one or multiple virtualization technologies and/or virtual network device, such as a virtualized network function (VNF), a server device, a host device, a container, a hypervisor, a virtual machine (VM), a network function virtualization infrastructure (NFVI), a network function virtualization orchestrator (NFVO), a virtual network function manager (VNFM), a platform manager and/or other types of virtualization elements, layers, hardware resources, operating systems, engines, etc. According to an exemplary embodiment, the polymorphic algorithms of the first tier may operate at a longer time granularity relative to the second tier and the third tier. First tier polymorphic algorithms and platform 317 may also have a different scope (e.g., virtual network core, external network) than the scopes of the second tier and the third tier, as described herein.

First tier aggregation device 319 may include a centralized traffic aggregation device. First tier aggregation device 319 may include a RAN device (e.g., CU-User Plane (CU-UP), CU-Control Plane (CU-CP), etc.), a core device (e.g., a PGW device, a UPF device, a DNAP, etc.), and/or an external network device (e.g., a DNAP, a PGW, a UPF, etc.). First tier aggregation device 319 may include an application layer device, such as a virtual network device (e.g., a server device, a host device, a container, a VM, etc.). First tier aggregation device 319 may be configured on a per application basis of the beamforming-based detection service. For example, the per application basis may relate to health monitoring versus manufacturing, and so forth.

As illustrated further illustrated, external network 321 may include a near-real-time RIC 323, a second tier polymorphic algorithms and platform 325, and second tier aggregation devices 327.

Near real-time RIC 323 may support near real-time intelligent radio resource management, QoS management, connectivity management, and handover management in access network 105. For example, near real-time RIC 323 may control and optimize various radio resources, such as the selection of access devices 110 (e.g., an eNB, a DU, a gNB, a beacon, RHU, RU, etc.) associated with access network 105 in support of the beamforming-based detection service.

Second tier polymorphic algorithm and platform 325 includes network devices that host polymorphic algorithms. For example, second tier polymorphic algorithms and platform 325 may include one or multiple virtualization technologies, as described herein. According to an exemplary embodiment, the polymorphic algorithms of the second tier may operate at a longer time granularity relative to the third tier. Second tier polymorphic algorithms and platform 325 may also have a different scope (e.g., virtual network edge) than the scopes of the first tier and the third tier, as described herein.

Second tier aggregation device 327 may include an external device 125. Second tier aggregation device 327 may be configured on a per application basis of the beamforming-based detection service, for example.

As further illustrated, far edge RAN 330 may include a third tier polymorphic algorithms and platform 331 and third tier aggregation devices 333.

Third tier polymorphic algorithms and platform 331 includes network devices that host polymorphic algorithms. For example, third tier polymorphic algorithms and platform 331 may include one or multiple virtualization technologies, as described herein. According to an exemplary embodiment, the polymorphic algorithms of the third tier may operate at a shorter time granularity relative to the first tier and the third tier. Third tier polymorphic algorithms and platform 331 may also have a different scope (e.g., virtual network far edge) than the scopes of the first tier and the third tier, as described herein.

Third tier aggregation device 333 may include a radio portion of access device 110. Third tier aggregation device 333 may include an application layer device. Third tier aggregation device 333 may be configured on a per application basis of the beamforming-based detection service, for example.

According to other exemplary embodiments, the beamforming-based detection service may be implemented without in whole or in part the polymorphic algorithm-based network system. According to still other exemplary embodiments of system 300, multiple network devices may be combined into a single network device. For example, orchestrator device 309 may include AI/ML system 307 and/or algorithm repository 305. Additionally, or alternatively, a single network device may be implemented as multiple network devices in which a process or a function may be collaboratively performed or multiple processes or functions may be split between them. For example, orchestrator device 309 may be implemented to include an orchestrator device that manages a per application basis of the beamforming-based detection service, and another orchestrator device that manages the polymorphic algorithms. Other variations of system or environment 300 may be implemented.

Figure 3B:
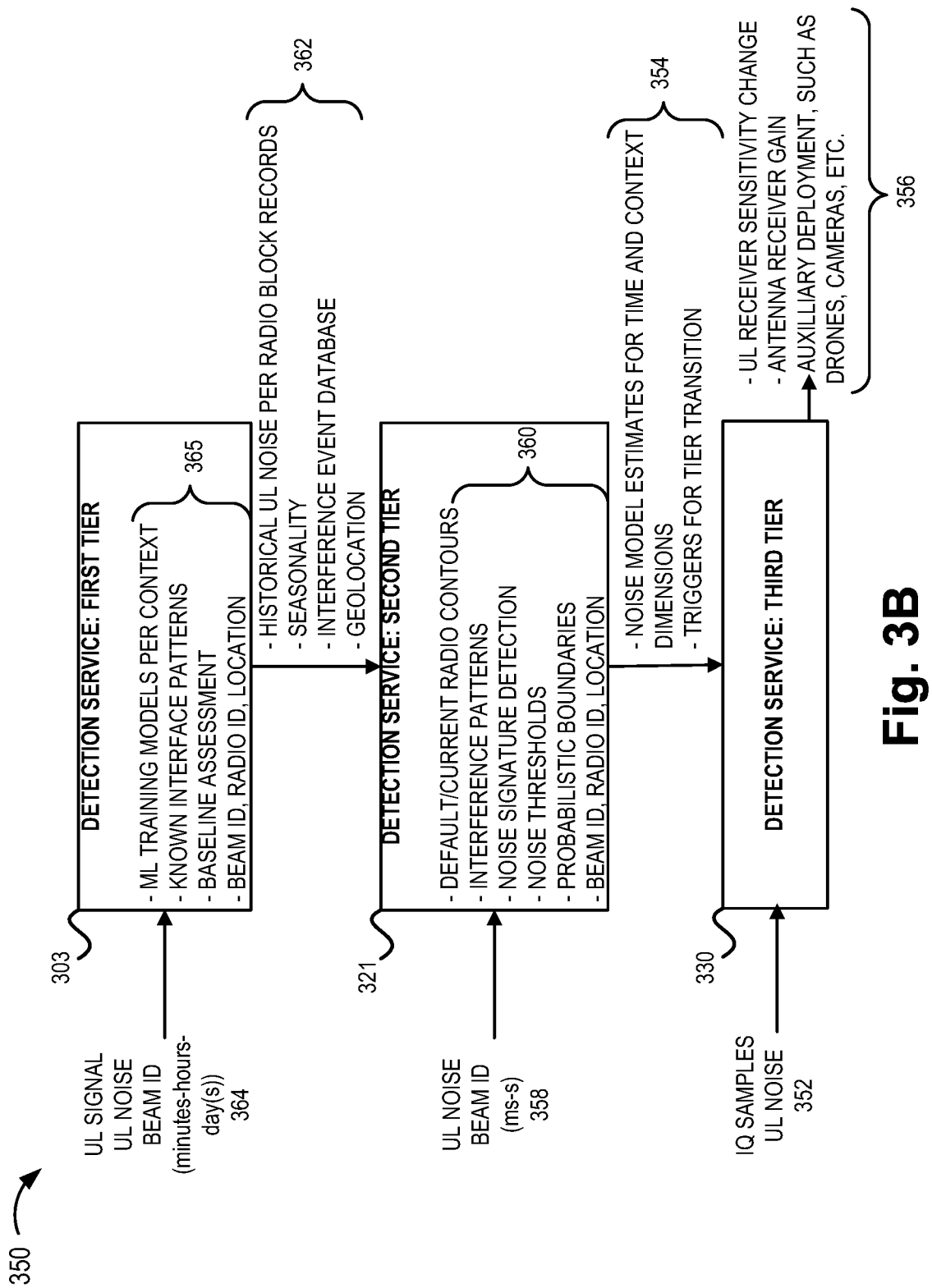
FIG. 3B is a diagram illustrating an exemplary process of the beamforming-based detection service.

FIG. 3B is a diagram illustrating an exemplary process 350 of an exemplary embodiment of the beamforming-based service. Referring to third tier 330 and FIG. 2, access device 110 may receive radio information from the location. As previously mentioned, the radio information may include a mm wave signal, noise, a downlink reference signal (e.g., that may include reference symbols) used to obtain an RSP value and/or other type of signal quality value associated with wireless communication with an end device (e.g., such as used in 4G and 5G), a dedicated radio signal (e.g., a non-reference signal, a probe or discovery radio signal, etc.), a paging signal or other type of communication signal in support of 5G wireless service, 4G wireless service, a signal transmitted by end device 140, a beacon, and so forth. Typically, however, high frequencies (e.g., GHz range, mm wave, higher than mm wave, etc.) may offer richer noise patterns than lower frequencies. Additionally, detection and analytics of other characteristics of the radio signal (e.g., signal envelope, interference profile, signal profile, etc.) may be impacted based on the frequency of the radio signal/beam.

Based on the received radio signal, access device 110 may calculate In-phase and Quadrature (IQ) component samples of the received radio signal 352. As an example with reference to an NR architecture (e.g., RU or DU), the I-Q samples may be obtained directly from the radio device (e.g., RU or DU) and may bypass the baseband processing (e.g., CU or BBU). Access device 110 may also estimate noise 352 included in the received radio signal. For example, access device 110 may estimate noise based on noise model estimates for time and context dimension information 354 obtained from second tier 321. According to an exemplary embodiment, access device 110 may transmit the I/Q component samples and noise estimate to external device of second tier 321. Access device 110 may provide other information, such as beam identifier, location information (e.g., sector, geo-bin, etc.), and access device 110 identifier, for example. According to other exemplary embodiments, access device 110 may perform one or more operations described in relation to second tier 321. For example, access device 110 may generate a radio contour or generate the radio contour and compare the radio contour to a default radio contour, and so forth. Access device 110 may store radio contours, noise profiles, signal profiles, and/or threshold values relating to SINR, RSSI, RSP, and/or other radio signal parameter values.

According to an exemplary embodiment, access device 110 of third tier 330 may perform these operations as a basis to generate a default radio contour of the location, as described herein. As a part of this process, access device 110 may lower the receiver sensitivity and adjust antenna receiver gain 356. This process may enhance the ability to profile noise in the location and identify patterns over time in support of the generation of the default radio contour. There may be multiple default radio contours based on multiple time windows, activity levels, and/or other factors that may be associated with a given location, for example. According to some implementations, there may be auxiliary deployments of sensors, drones, cameras, and/or other devices 356 to contribute radio information towards the generation of the default radio contour. As an example, the default radio contour may indicate the radio contour of the location in which an event, object, motion of an object, etc., may be absent and/or is indicative of a steady state. Access device 110 may also perform these operations for AI/ML purposes as a basis to generate a radio contour of the location in which the event may be present (referred to as an event-based radio contour). As an example, in the health-monitoring context, an event-based radio contour may be used to detect when a person has fallen to the ground.

Also, access device 110 may perform these operations as a basis to detect an event, an object, motion of an object, etc., that may occur in the location after the event-based radio contour has been generated (e.g., a current radio contour), as a part of the beamforming-based detection service. As further illustrated, second tier 321 may provide access device 110 of third tier 330 with trigger information for tier transition. For example, access device 110 may be unable to estimate a noise profile or another anomaly occurs. According to other examples, access device 110 may determine that the location subject to the detection service is not in a default state, access device 110 may provide the radio information and/or the current radio contour to external device 125 of second tier 321.

Referring to external device 125 of second tier 321 may calculate a radio contour for each geo-bin based on UL noise and beam identifier information 358 from access device 110 of third tier 330. For example, for each geo-bin of coverage, a radio contour may be generated based on the exemplary expression:

$$W_{xy} = f(B_j, RSP_{xy}, SINR_{xy}, RSSI_{xy}) \quad (1),$$

in which $B_j$ may be the radio beam (j=1 to N beam positions), $RSP_{xy}$ is the Reference Signal Power of the radio signal relating to a segmentation of a location (e.g., geo-bin 215), $SINR_{xy}$ is the Signal-to-Noise-Ratio of the radio signal relating to the segmentation of the location (e.g., geo-bin 215), and $RSSI_{xy}$ is the Received Signal Strength Indicator (e.g., total signal power, NR-RSSI, etc.) of the radio signal (e.g., signal and noise) relating to the segmentation of the location. For W, RSP, SINR, and RSSI, x=1 to S; y=1 to M, such that x and y may relate to a coordinate system. According to other examples, an x, y, and z coordinate system may be implemented. In this way, an output of function $f$ may provide the radio contour W for each geo-bin 215 subject to radio beam $B_j$ and associated RSP, SINR, and RSSI values.

According to an exemplary embodiment, external device 125 of second tier 321 may perform these operations as a basis to generate a default radio contour of the location, an event-based radio contour, or a current radio contour, as described herein. For example, the beamforming-based detection service may include learning noise patterns and identifying a default state and an event-based state of an environment subject to the service. The system of the beamforming-based detection service may collect and learn radio contours, signal profiles, noise profiles, and signal parameter values to understand and identify default and event-based states. For example, the training of the system that provides the beamforming-based detection service may include producing events to be detected and learning the radio contour, signal/noise profile, signal parameter values, and other characteristics, patterns, or the like based on the received radio information. Additionally, for example, the training of the system may include collecting radio information to identify a default or steady state radio contour, signal/noise profile, signal parameter values, and other characteristics, patterns, or the like.

According to an exemplary embodiment, the beamforming-based detection service may extract the signal component and profile the noise component to match and identify a default state and/or an event. For example, the beamforming-based detection service may compare the noise component to stored default and/or event-based noise profiles, and determine whether there is a match or not, or whether there is a pattern change, an unknown profile, and so forth.

According to other exemplary embodiments, the signal profile and/or the noise profiles may be compared to stored default and/or event-based profiles. For example, when an event occurs, the signal and/or the noise may change and this change may be detected. According to still other exemplary embodiments, signal parameter values (e.g., RSP, RSSI, SINR, etc.) may also be used for comparison, identifying variations, unknown states, and/or other analytic processes.

As further illustrated, external device 125 may store and use default and event-based radio contours for pattern matching of current radio contours 360. In this way, external device 125 may use the default and event-based radio contours to detect the occurrence of an event or the non-occurrence of an event in a location. External device 125 may also generate and/or store various types of radio signal characteristic information 360, noise profiles, signal profiles, and may include analytics relating to interference patterns, noise signature detection, and noise thresholds values in support of the beamforming-based detection service of a location. For example, interference patterns and other types of radio signal parameter values (e.g., RSP, RSSI, etc.) associated with neighboring access devices 110 and access device 110 of a location may be obtained. Additionally, external device 125 may include probabilistic boundary information for determining whether a current radio contour matches (e.g., within a margin of error or degree of certainty) a default or event-based radio contour.

External device 125 may receive various type of information from first tier 303 of a time granularity, such as historical uplink noise per radio block records and interference information 362 that may be associated with a geolocation, time, season, etc., that may be used by external device 125 to provide the beamforming-based detection service, as described herein.

According to an exemplary embodiment, external device 125 may provide a response to the detection of the event. For example, external device 125 may be configured to alert a person, a service, or other entity; generate and transmit a message that indicates the detection of the event; and/or other types of appropriate responses which may depend on the type of event, the surveilled location, a subscriber's preference, the context, and/or other factors.

According to an exemplary embodiment, external device 125 may receive radio information from end devices 140. For example, end devices 140 my include an application that supports the beamforming-based detection service in which end devices 140 may listen via radio receivers and provide the radio information to external device 125. External device 125 may use this harvested radio information in collaboration with the radio information, radio contours, noise profiles, signal profiles, and/or signal parameter values which may be obtained from access device 110. Additionally, for example, external device 120 may invoke (e.g., request or instruct) radio information harvesting to be performed by end devices 140 and/or other access devices 110. As an exemplary use case, external device 120 may invoke this procedure to support a learning process of an event or an unknown event. External device 120 may also target a particular location, access devices 110, beacons, or the like for radio information, current radio contours, noise profiles, signal profiles, and/or signal parameter values.

Referring to first tier 303, network devices may use machine learning training models per context and generate default and event-based radio contours 365 of the beamforming-based detection service. First tier 303 may receive uplink signals, uplink noise, and beam identifiers 364 for analytics purposes over its time granularity. The network devices of first tier 303 may also modify or create new event-based radio contours responsive to a tier transition from second tier 321 of the beamforming-based detection service. As an example, when external device 125 is unable to match the current radio contour to the default radio contour or the event-based radio contours of the location, the beamforming-based detection service may transition to first tier 303, as described herein.

FIG. 4 is a diagram illustrating exemplary components of a device 400 that may be included in one or more of the devices described herein. For example, device 400 may correspond to access devices 110, external devices 125, and other types of network devices or logic of system 300, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to access device 110, software 420 may include an application that, when executed by processor 410, provides a function of the beamforming-based detection service, as described herein. Additionally, for example, with reference to external device 125, software 420 may include an application that, when executed by processor 410, provides a function of the beamforming-based detection service. Also, for example, with reference to system 300 and/or components thereof, software 420 may include an application that, when executed by processor 410 provides a function of the beam-forming-based detection service. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, O-RAN interface, a reference interface, etc., as previously described. Communication interface 425 may be implemented to include logic that supports the beamforming-based detection service, such as the transmission and reception of messages, as described herein.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 5:
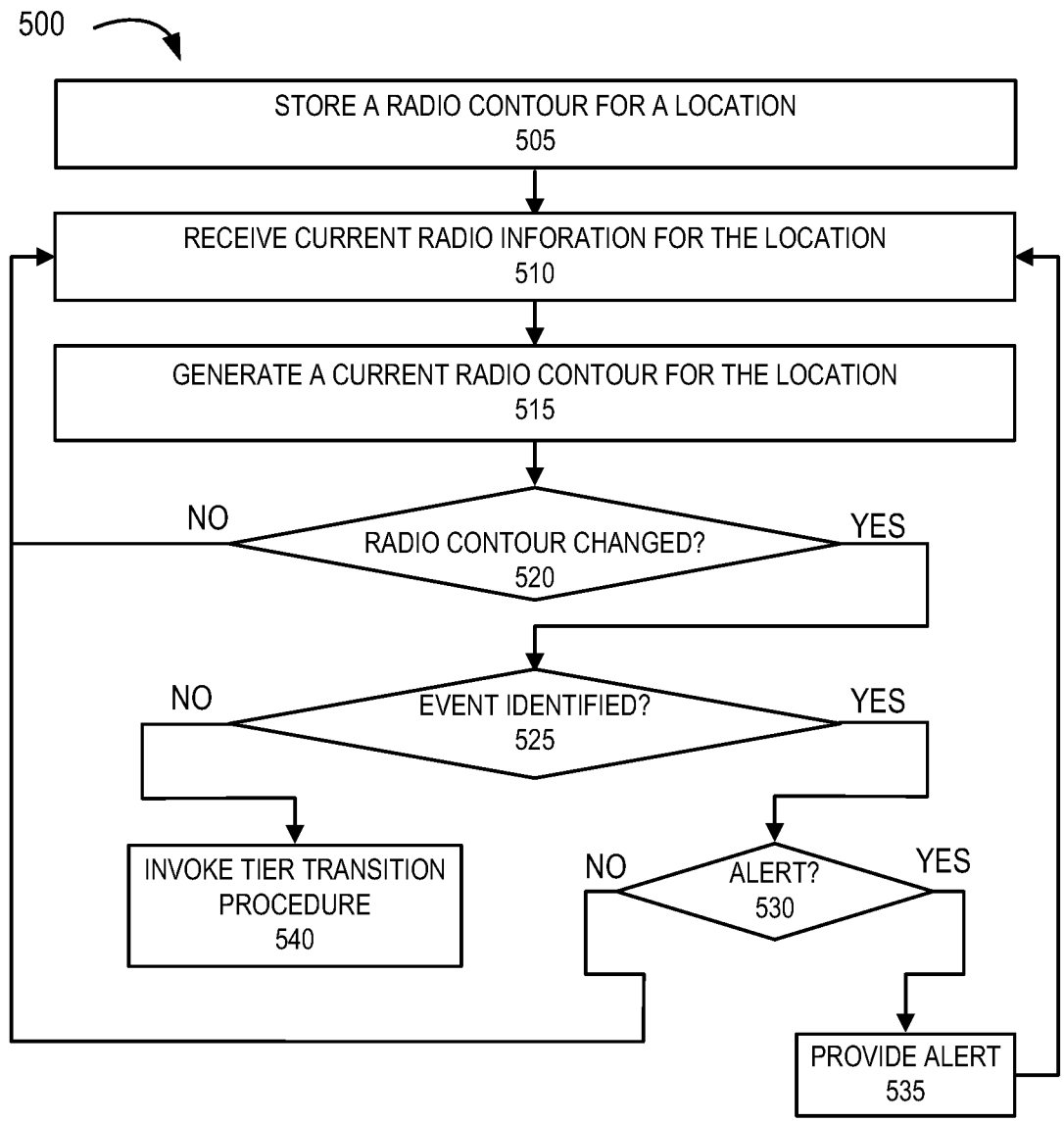
FIG. 5 is a flow diagram illustrating an exemplary process of an exemplary embodiment of the beamforming-based detection service.

FIG. 5 is a flow diagram illustrating an exemplary process 500 of an exemplary embodiment of the beamforming-based detection service. According to an exemplary embodiment, external device 125 may perform a step of process 500. According to another exemplary embodiment, access device 110 may perform a step of process 500. According to still other exemplary embodiments, external device 125 and access device 110 may perform a step of process 500. According to an exemplary implementation, processor 410 executes software 420 to perform a step illustrated in FIG. 5 and described herein. Alternatively, a step illustrated in FIG. 5 and described herein, may be performed by execution of only hardware.

Referring to FIG. 5, in block 505, a radio contour for a location may be stored. For example, the radio contour may include a default radio contour and/or an event-based radio contour of the location.

In block 510, current radio information for the location may be received. For example, the radio information may include a radio signal and noise. The radio signal and noise may relate to mm wave radio spectrum, as described herein. Based on the radio signal and noise, I-Q samples, noise information, and/or other radio signal characteristic information may be generated. The current radio information may include an access device identifier, a radio beam identifier, and/or other information, as described herein.

In block 515, a current radio contour for the location based on the current radio information. For example, the current radio contour may be generated based on expression (1).

In block 520, it may be determined whether the radio contour has changed. For example, according to an exemplary embodiment, a default radio contour may be compared to the current radio contour. Based on a result of the comparison, it may be determined that the radio contour has changed when the default radio contour and the current radio contour do not (substantially) match. Alternatively, it may be determined that the radio contour has not changed when the default radio contour and the current radio contour (substantially) match. According to another exemplary embodiment, it may be determined whether a noise profile has changed. For example, a default noise profile may be compared to a current noise profile. For example, a signal component of the radio contour may be extracted or dialed out. Based on a result of the comparison, it may be determined whether the location subject to the detection service is in a default or steady state or not. According to yet another exemplary embodiment, it may be determined whether a signal profile has changed. For example, a default signal profile may be compared to a current signal profile. Based on a result of the comparison, it may be determined whether the location subject to the detection service is in a default or steady state or not.

When it is determined that the radio contour has not changed (block 520-NO), process 500 may return to block 510. Similarly, according to other exemplary embodiments, when the noise profile or the signal profile has not changed, process 500 may return to block 510. When it is determined that the radio contour has changed (block 520-YES), it may be determined whether an event has been identified (block 525). For example, the current radio contour may be compared to an event-based radio contour. Based on the result of the comparison, it may be determined that an event has been identified when the current radio contour (substantially) matches the event-based radio contour, and an event has not been identified when the current radio contour does not (substantially) match the event-based radio contour. Similarly, according to other exemplary embodiments, when the current noise profile or the current signal profile (substantially) matches the corresponding event-based noise profile or event-based signal profile, it may be determined that an event has been identified, and when the current noise profile or the current signal profile does not (substantially) match, it may be determined that an event has not been identified.

When it is determined that the event has been identified (block 525-YES), it may be determined whether to provide an alert (block 530). For example, depending on the type of event, preference of the user subscribed to the beamforming-based detection service, or other configurations, factors, context, etc., an alert may or may not be provided, as described herein. When it is determined that the event has not been identified (block 525-NO), a tier transition procedure may be invoked (block 540).

When it is determined that the alert is to be provided (block 530-YES), the alert is provided (block 535). For example, a person, an entity, another service may be notified, a message may be transmitted or another type of response that may serve as a notification of the detection of the event. When it is determined that the alert is not to be provided (block 530-NO), process 500 may return to block 510.

FIG. 5 illustrates an exemplary process 500 of the beamforming-based detection service, however, according to other embodiments, process 500 may include additional operations, fewer operations, and/or different operations than those illustrated in FIG. 5, and described herein.

FIGS. 6A-6F are diagrams illustrating an exemplary embodiment of the beamforming-based detection service according to an exemplary scenario. Referring to FIG. 6A, assume that access device 110 probes a location and receives reflected data 610. For example, the reflected data may indicate that a person 605 was walking or standing upright and later fell and is currently positioned on the ground. In FIG. 6B, access device 110 generates radio information (e.g., noise data and I-Q sampling data), and in FIG. 6C, access device 110 transmits the radio information 620 to a MEC server 625 located in a MEC network. In FIG. 6D, MEC server 625 generates a current radio contour 630. In FIG. 6E, MEC server 625 identifies that an event occurred 635 based on the comparison of the current radio contour with an event-based radio contour. In FIG. 6F, MEC server 625 determines to provide an alert 640. For example, MEC server 625 may provide an alert to an end device 645 (e.g., a relative of person 605 or person), and/or may provide an alert to network device 650. Network device 650 may be associated with the fire department, an ambulance service, a communication center, or other entity to which the alert is to be provided. The alert may indicate the event, location data, and other information.

According to other exemplary scenarios, access device 110 may not receive reflected data. For example, as previously described, the radio information may pertain to a signal from a beacon or end device 140, or an ambient signal.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described for the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a network device, current radio data of a reflected radio signal directed to a location subject to monitoring;
generating, by the network device based on the current radio data, a current radio contour for the location, wherein the current radio contour includes a current noise profile;
comparing, by the network device, the current radio contour to a default radio contour of the location;
determining, by the network device, that the current radio contour does not match the default radio contour;
comparing, by the network device, the current radio contour to an event-based radio contour;
determining, by the network device based on the comparing, that an event has occurred; and
providing, by the network device, a response to the event.

2. The method of claim 1, wherein the current radio data includes radio signal data and noise data associated with a millimeter wave or higher radio spectrum.

3. The method of claim 1, further comprising:
generating, by the network device, the default radio contour of the location.

4. The method of claim 1, wherein the generating comprises:
generating, by the network device, a Reference Signal Power (RSP) value, a Signal-to-Noise Ratio (SINR) value, and a Received Signal Strength Indicator (RSSI) value based on the current radio data.

5. The method of claim 1, wherein the event-based radio contour is generated based on an artificial intelligence system, and wherein the event-based radio contour includes at least one of a signal profile or a noise profile indicative of the event.

6. The method of claim 1, wherein the current radio data is based on a transmission of a downlink reference signal associated with a wireless mobile communication service.

7. The method of claim 1, wherein the receiving comprises:
receiving, by the network device, the current radio data from at least one of a radio access network device or an end device based on an instruction from the network device to the at least one of the radio access network device or the end device to collect the current radio data.

8. The method of claim 1, wherein the network device includes a multi-access edge computing (MEC) server or a radio access network device, and wherein the event relates to health monitoring, manufacturing, drones, military, or public safety.

9. A network device comprising:
a processor, wherein the processor is configured to:
receive current radio data of a reflected radio signal directed to a location subject to monitoring;
generate, based on the current radio data, a current radio contour for the location, wherein the current radio contour includes a current noise profile;
compare the current radio contour to a default radio contour of the location;
determine that the current radio contour does not match the default radio contour;
compare the current radio contour to an event-based radio contour;
determine, based on the comparison, that an event has occurred; and
providing, by the network device, a response to the event.

10. The network device of claim 9, wherein the current radio data includes radio signal data and noise data associated with a millimeter wave or higher radio spectrum.

11. The network device of claim 9, wherein the processor is further configured to:
generate the default radio contour of the location.

12. The network device of claim 9, wherein when generating, the processor is further configured to:
generate a Reference Signal Power (RSP) value, a Signal-to-Noise Ratio (SINR) value, and a Received Signal Strength Indicator (RSSI) value based on the current radio data.

13. The network device of claim 9, wherein the event-based radio contour is generated based on an artificial intelligence system, and wherein the event-based radio contour includes at least one of a signal profile or a noise profile indicative of the event.

14. The network device of claim 9, wherein the current radio data is based on a transmission of a downlink reference signal associated with a wireless mobile communication service.

15. The network device of claim 9, wherein the processor is further configured to:
receive the current radio data from at least one of a radio access network device or an end device based on an instruction from the network device to the at least one of the radio access network device or the end device to collect the current radio data.

16. The network device of claim 9, wherein the network device includes a multi-access edge computing (MEC) server or a radio access network device, and wherein the event relates to health monitoring, manufacturing, drones, military, or public safety.

17. A non-transitory computer-readable storage medium storing instructions executable by a processor of a network device, which when executed cause the network device to:
receive current radio data of a reflected radio signal directed to a location subject to monitoring;
generate, based on the current radio data, a current radio contour for the location;
compare the current radio contour to a default radio contour of the location;
determine that the current radio contour does not match the default radio contour;
compare the current radio contour to an event-based radio contour;
determine, based on the comparison, that an event has occurred; and
provide a response to the event.

18. The non-transitory computer-readable storage medium of claim 17, wherein the current radio data includes radio signal data and noise data associated with a millimeter wave or higher radio spectrum.

19. The non-transitory computer-readable storage medium of claim 17, wherein the instructions further comprise instructions, which when executed cause the network device to:
generate the default radio contour of the location.

20. The non-transitory computer-readable storage medium of claim 17, wherein the event-based radio contour is generated based on an artificial intelligence system, and wherein the event-based radio contour includes at least one of a signal profile or a noise profile indicative of the event.

* * * * *